H. A. DARTING.
MACHINE FOR SCALDING TOMATOES.
APPLICATION FILED MAY 10, 1911.
1,015,379. Patented Jan. 23, 1912.
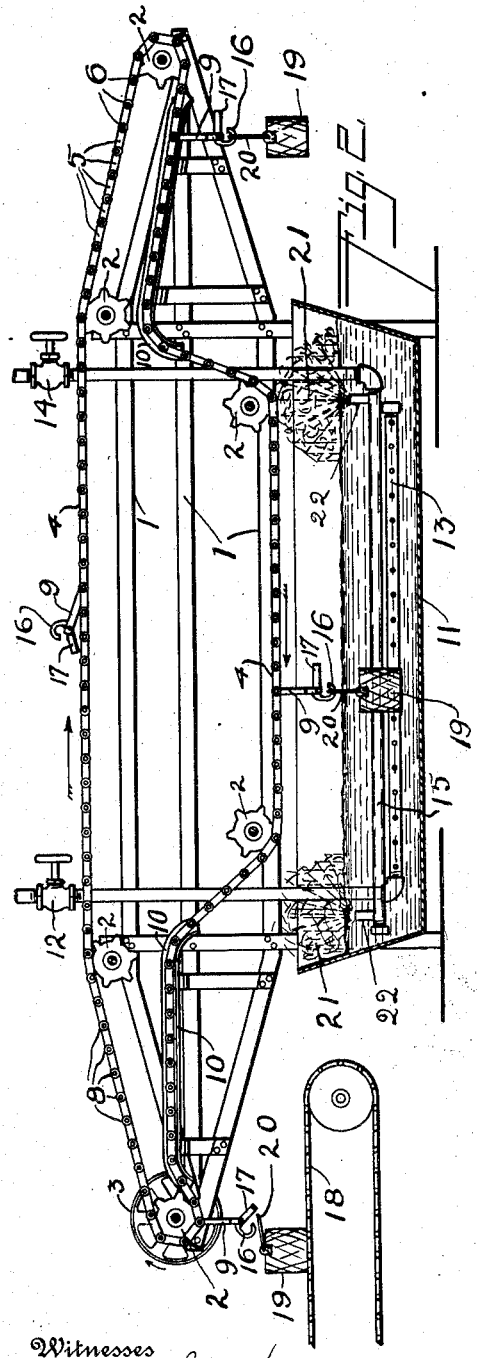
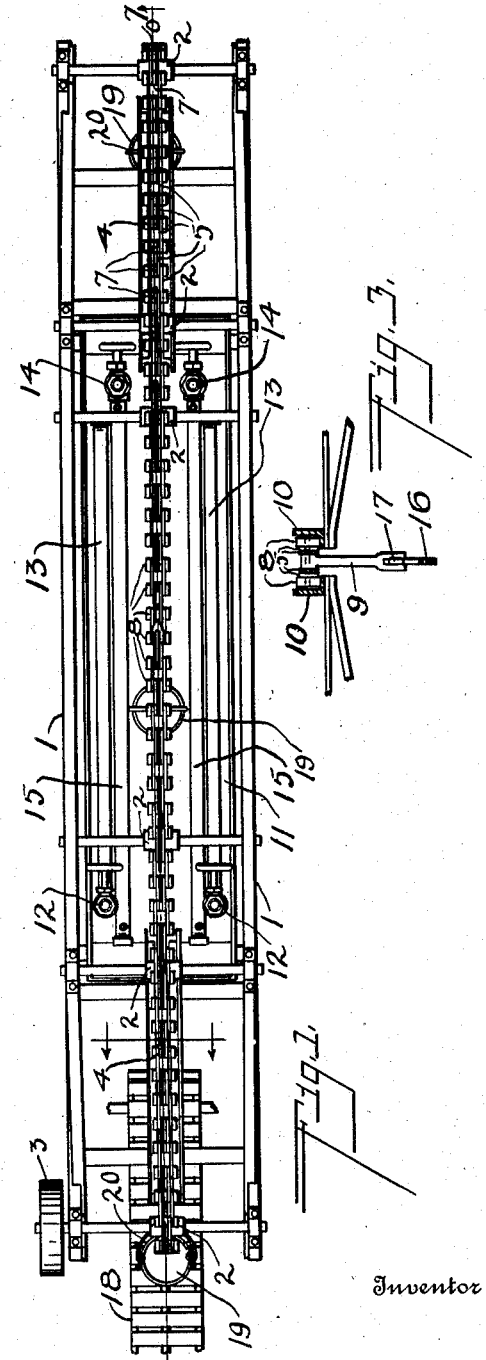

UNITED STATES PATENT OFFICE.

HARMEN A. DARTING, OF GLENWOOD, IOWA.

MACHINE FOR SCALDING TOMATOES.

1,015,379.  Specification of Letters Patent.  Patented Jan. 23, 1912.

Application filed May 10, 1911. Serial No. 626,378.

*To all whom it may concern:*

Be it known that I, HARMEN A. DARTING, of Glenwood, in Mills county, in the State of Iowa, have invented certain new and useful Improvements in Machines for Scalding Tomatoes, which improvements are described in the following specification and are illustrated by the accompanying drawings.

The invention relates to machines of that class which are used for scalding tomatoes and other fruits in preparation for canning, and which operate by immersing successive quantities of the fruit in scalding water by means of an endless carrier. Some machines of this class bruise or injure the fruit by hard usage; some of them scald different portions of a single basket of fruit unequally; and some, failing to discharge the scalded fruit automatically, require an inconvenient or harmful transfer of the same by hand, as it is delivered from the machine.

It is the object of the invention to avoid all these disadvantages, and in general to produce a superior scalding machine of the specified class. To accomplish this object I incorporate in my improved scalding machine an endless carrier having dependent hangers carrying self-acting hooks adapted to engage fruit baskets, steam pipes adapted to throw a spray of scalding water onto the fruit while entering and while leaving the hot-water tank in such baskets, and an endless conveyer on which the baskets of fruit are automatically deposited and unhooked after scalding.

The best manner in which I have contemplated applying the principles of the invention, is shown in said drawings.

Figure 1 is a plan of a tomato-scalding machine which is constructed in accordance with these principles. Fig. 2 is a section on line 00 of Fig. 1. Fig. 3 is a detail.

On the frame 1 are journaled the parallel shafts of the sprocket wheels 2, which are driven by pulley 3 and engage the carrier chain 4. This chain, being of the double roller sprocket type, comprises the usual double links 5, the shafts 6 connecting those links, and the bushings 7 and rollers 8 on those shafts. A number of these bushings, at suitable distances apart, are provided with dependent hangers 9, and these in turn with hooks 16 having counterbalancing shanks 17. Through a portion of its circuit the same chain is supported and directed by the bent tracks 10, consisting of angle irons mounted on the frame 1 and engaged by the rollers 8. Under the middle of the carrier chain is placed the tank 11, containing water kept scalding hot by steam, which is admitted for that purpose through the pipes 13 by the valves 12. For the same purpose of heating the water and for the additional purpose of spraying the fruit, steam is also admitted to the tank by the regulating valves 14 and the open-mouthed pipes 15 having nozzles 22 discharging upward somewhat below the water surface. At the delivery end of the machine, and partly under the carrier chain, is placed the horizontal endless conveyer 18, in a position to receive baskets of fruit scalded and ready to be peeled and canned. The baskets 19, preferred for this use, are of wire and uncovered and provided with bails 20.

In the operation of the machine, steam may be supplied to the specified pipes from the boiler of the same engine which drives the carrier and the conveyer. Each fruit basket, being hung by hand on one of the hooks 16 at the receiving end of the machine, as shown at the right in Fig. 2, is transferred by the continuous movement of the carrier, first to a position above the receiving end of the tank, then obliquely downward, through the spray 21 of steam and water thrown up from pipe 15 at that end of the tank, into the scalding water, then under the surface of the water horizontally to the delivery end of the tank, then obliquely upward, out of the water, through the like spray 21 at that end of the tank, then in an approximately horizontal direction to a position above the conveyer 18, and then obliquely downward to a position of rest on that conveyer. As the weight of the basket and its contents is thus transferred to the conveyer from the counterbalanced hook 16, the latter, being operated by the weight of its shank 17, is automatically released from its load, as shown at the left in Fig. 2. Successive baskets of fruit, so transferred and scalded in transit, are thus deposited upon the conveyer, and are thereby carried to the hands of operatives who peel the fruit for canning. In this operation the fruit is not exposed to any violence, handling or hard usage, either while being scalded or while being transferred from the scalder; and the top and bottom portions of each basketful are scalded with approximate uniformity, being exposed to the scalding spray both while entering and while leaving the water.

As many changes could be made in the above construction, and many apparently different embodiments of the invention, without departing from its spirit or scope, it is intended that all the matters contained in the foregoing description or shown in the accompanying drawings, shall be interpreted as illustrative and not in a limiting sense.

Part of the subject matter of invention shown but not claimed in this application is shown and claimed in my divisional application No. 657,445, filed October 30, 1911, on apparatus for conveying fruit baskets and the like.

I claim as my invention:—

1. In a machine for scalding fruit, an endless carrier, a plurality of fruit baskets dependent from the carrier, a hot-water tank in the line of travel of the baskets, and means normally submerged within the tank for throwing upward therein by steam pressure a mixture of the steam and the hot water into the path of the baskets below the carrier and above the water level in the tank.

2. In a machine for scalding fruit, an endless carrier, a plurality of fruit baskets carried thereby, a tank for hot water in a line of travel of the baskets, and means normally submerged in the tank for throwing up hot water between the carrier and the water level.

3. A scalding machine, comprising an endless carrier, a plurality of fruit baskets transported by the carrier, a hot-water tank in the line of travel of the baskets, a steam pipe normally submerged in the tank and having upwardly directed nozzles in the water under the carrier.

4. In a machine of the described class, a hot-water tank, an endless carrier traveling above the hot water, a plurality of fruit baskets transported by the carrier, and normally submerged steam pipes opening upward in the tank and below the carrier.

5. In a machine of the described class, a hot-water tank, a carrier, a plurality of fruit baskets transported by the carrier into, through and out of the hot water, and a steam pipe normally submerged in the tank and opening upward in the hot water near the ascending and descending baskets.

6. A fruit-scalding machine, comprising an endless carrier, a plurality of hangers dependent from the carrier, a plurality of fruit baskets dependent from the hangers, a tank of hot water in the line of travel of the baskets, and means normally submerged in the tank for throwing a portion of the hot water upward by steam pressure onto the baskets passing the water level in the tank.

In testimony whereof I hereunto subscribe my name in the presence of two witnesses.

HARMEN A. DARTING.

Witnesses:
H. T. Foss,
S. B. Alloway.